W. C. Chipman,
Sawing Stone.
No 13,777.   Patented Nov. 13, 1855.
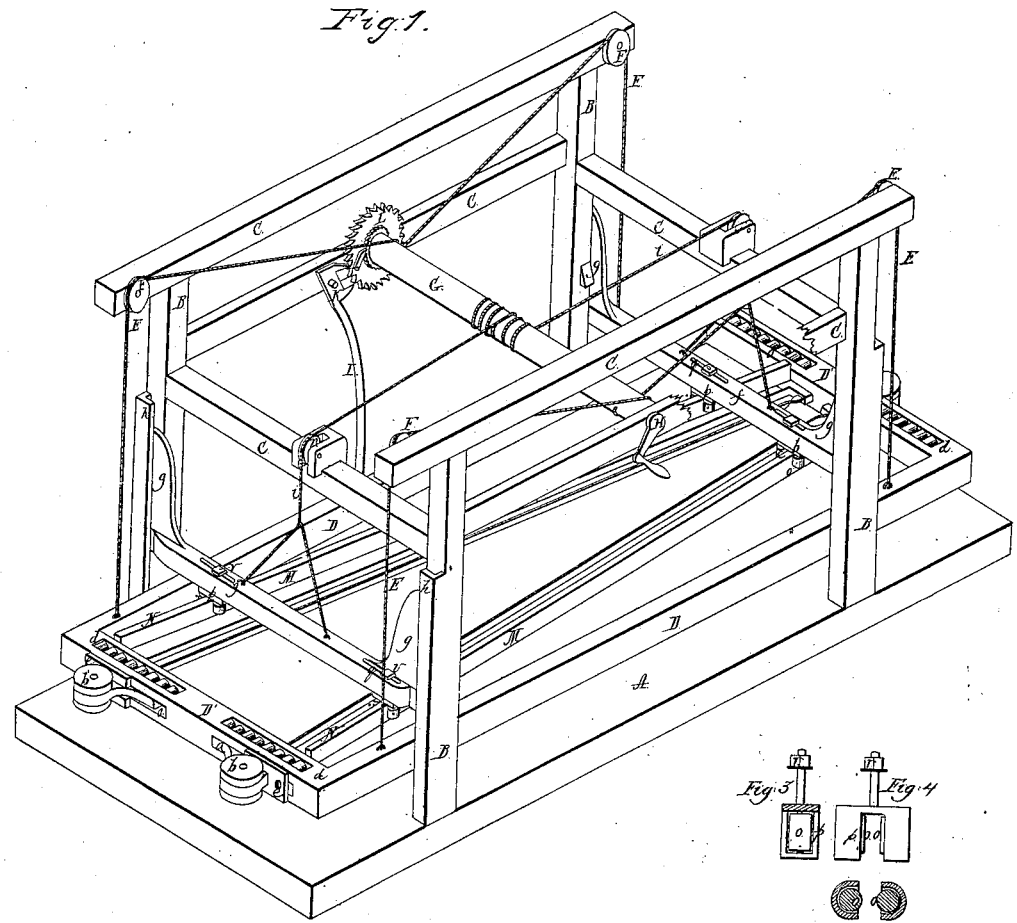
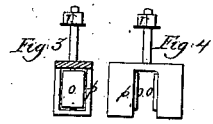
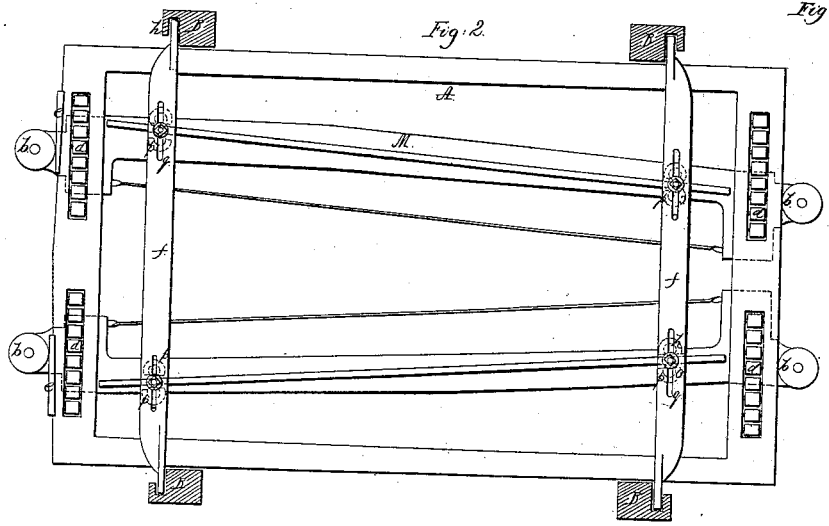

UNITED STATES PATENT OFFICE.

WILLIAM C. CHIPMAN, OF SANDWICH, MASSACHUSETTS.

MARBLE-SAWING MACHINE.

Specification of Letters Patent No. 13,777, dated November 13, 1855.

*To all whom it may concern:*

Be it known that I, WILLIAM C. CHIPMAN, of Sandwich, in the county of Barnstable and State of Massachusetts, have invented new and useful Machinery for Sawing Stone; and I do hereby declare that the following is a full, clear, and exact description of the construction and operation of the same, reference being had to the annexed drawings, which make a part of this specification, in which—

Figure 1, is a perspective view of the machine. Fig. 2, is the lower section of the same. Figs. 3 and 4 are different views of iron blocks with rollers.

My machine is constructed and works within a frame upon a platform.

The same letters in each figure refer to the same parts.

In Fig. 1, A, is the platform, B, B, B, B, are four posts, which, with the timbers C, C, C, C, C, C, constitute the principal frame work. The timbers D, D, and the iron bars D', D', across each end, constitute an oblong square saw frame, which carries the saws and which is suspended by, and swings upon the four ropes E, E, E, E, which passing over the pulleys F, F, F, F, are attached to the shaft or windlass G, so that the frame and saws are raised by the crank H and are lowered or fed by the vibrating motion of the frame, which moves the rod I, like a pendulum. Upon the upper end of this rod I are pallets K working in an escapement wheel L which lowers or feeds the saws as before stated.

M, M, are the frames of the bow saws and $m$, $m$, are the saws themselves, (the frames and saws are better shown in Fig. 2.) Attached to each of the frames M, M, is a strip of wood N, about four or five inches high, which I call ways extending the whole length of the saws. Each end of the saw frames M, M, extend through the slots $a$, $a$, in the iron bars D', D', and are securely held lengthwise, by the rollers and bolts $b, b$, and at the same time may work laterally with freedom within the slots $a$, $a$, this motion being made easier by a series of friction rollers as $d$, $d$, $d$, $d$, which sustain the chief weight that may at any time bear upon the saws.

$e$, $e$, are two adjustable plates of iron, upon the iron bar D', which it will be seen (in Fig. 2) is slightly beveled from the center toward each end and the plates, to a corresponding extent are made wedge-shaped and serve when necessary to tighten lengthwise, the saw frame. These plates have slots to correspond with those marked $a$, $a$.

$f$, $f$, are two timbers with slides $g$, $g$, $g$, $g$, on each end, which are raised or lowered along the grooves $h$, $h$, by the ropes $i$, $i$, which pass over the pulleys $n$, $n$, and are attached to the windlass G, and by it are raised with, and in the same manner as the saw frame. Upon each of the timbers $f$, $f$, are two adjustable iron blocks $p$, $p$, $p$, $p$, and in each block are two rollers marked $o$, (better shown in Figs. 3 and 4.) These blocks are constructed so as to fit astride the strip or ways N, having a roller on each side and are made to grasp the ways N, more or less tightly at pleasure, by being turned more or less diagonally to it. These blocks are movable along the slots $q$, $q$, $q$, $q$, and are secured by the bolts and nuts $r$, $r$, $r$, $r$.

Figs. 2, 3 and 4 show some of the parts more fully than Fig. 1, but all have been sufficiently described.

The saws being raised sufficiently high by the windlass to admit the block of marble or stone to be cut, it is placed upon the platform and lined where it is to be cut, the saws are then lowered and adjusted exactly over the lines upon the stone and the saw frame with the saws put in motion by any of the ordinary processes and the work goes on with accuracy.

It will be seen that when the machine is in motion, the blocks $p$, $p$, $p$, $p$, and rollers $o$, serve as guides to keep each saw exactly in the cutting line while either end of the saw frame M, M, may move laterally with freedom.

What I claim as my invention and desire to secure by Letters Patent is—

The rollers, $d$, $d$, $d$, $d$, when arranged in the manner and for the purpose herein stated.

WM. C. CHIPMAN.

Witnesses:
J. BIGELOW,
JOHN L. SMITH.